US012760481B2

(12) United States Patent
Whitford

(10) Patent No.: US 12,760,481 B2
(45) Date of Patent: Oct. 13, 2026

(54) VEHICLE MITIGATION SYSTEM

(71) Applicant: Meridian Rapid Defense Group, LLC, Pasadena, CA (US)

(72) Inventor: Peter Duncan Whitford, Pasadena, CA (US)

(73) Assignee: MERIDIAN RAPID DEFENSE GROUP, LLC, Pasadena, CA (US)

( * ) Notice: Subject to any disclaimer, the term of this patent is extended or adjusted under 35 U.S.C. 154(b) by 0 days.

(21) Appl. No.: 18/220,142

(22) Filed: Jul. 10, 2023

(65) Prior Publication Data

US 2024/0084531 A1 Mar. 14, 2024

Related U.S. Application Data

(60) Provisional application No. 63/404,842, filed on Sep. 8, 2022.

(51) Int. Cl.

| | |
|---|---|
| ***E01F 13/02*** | (2006.01) |
| ***E01F 13/06*** | (2006.01) |
| ***E01F 13/12*** | (2006.01) |
| ***E05C 1/04*** | (2006.01) |
| ***E05C 3/06*** | (2006.01) |
| ***E05C 21/00*** | (2006.01) |

(52) U.S. Cl.

CPC .............. *E01F 13/06* (2013.01); *E01F 13/02* (2013.01); *E01F 13/12* (2013.01); *E05C 1/04* (2013.01); *E05C 3/06* (2013.01); *E05C 21/00* (2013.01)

(58) Field of Classification Search

CPC ........... E01F 13/06; E01F 13/02; E01F 13/12; E05C 1/04; E05C 3/06; E05C 21/00

See application file for complete search history.

(56) References Cited

U.S. PATENT DOCUMENTS

| | | |
|---|---|---|
| 1,449,518 A | 3/1923 | Lawson |
| 1,631,416 A | 6/1927 | Howard |
| 2,777,227 A | 1/1957 | Imhoff |

(Continued)

FOREIGN PATENT DOCUMENTS

| | | |
|---|---|---|
| EP | 3792401 B1 | 7/2022 |
| GB | 158281 A | 2/1921 |

(Continued)

OTHER PUBLICATIONS

Youtube: Meridian Rapid Defense Group—Archer Beam Gate Deployment and Use (Year: 2019).*

(Continued)

*Primary Examiner* — Muhammad Ijaz
*Assistant Examiner* — Susan M. Heschel
(74) *Attorney, Agent, or Firm* — Patterson + Sheridan, LLP

(57) ABSTRACT

A vehicle mitigation system includes a first portable barrier, a second portable barrier; and a gate assembly. The gate assembly includes a beam pivotally attached to the first portable barrier. The beam is capable of rotating between a closed position and an open position such that the beam remains substantially parallel to a surface on which the first and second portable barriers are positioned. The gate assembly includes at least one arrestor cable attached between the first portable barrier and the second portable barrier such that the arrestor cable spans a distance between the first and second portable barriers.

22 Claims, 8 Drawing Sheets

(56) References Cited

U.S. PATENT DOCUMENTS

| | | | | |
|---|---|---|---|---|
| 3,065,680 | A | 11/1962 | Wiedman, Sr. | |
| 3,135,062 | A | 6/1964 | Guerco | |
| 4,480,405 | A | 11/1984 | Ferguson | |
| 4,630,395 | A | 12/1986 | Nasatka | |
| 4,854,767 | A | 8/1989 | Sasaki | |
| 4,968,177 | A | 11/1990 | Bechtold | |
| 4,998,843 | A | 3/1991 | Mothe | |
| 5,101,595 | A * | 4/1992 | Rhoades | E05F 15/614 49/335 |
| 5,145,278 | A | 9/1992 | Lohrmann | |
| 5,228,237 | A | 7/1993 | Nasatka | |
| 5,356,119 | A | 10/1994 | Schock | |
| 5,549,410 | A | 8/1996 | Beryozkin et al. | |
| 5,752,691 | A | 5/1998 | Bashon et al. | |
| 5,997,211 | A | 12/1999 | Chou | |
| 6,079,904 | A | 6/2000 | Trisl | |
| 6,296,234 | B1 | 10/2001 | De Boer | |
| 6,679,649 | B1 | 1/2004 | Capolupo | |
| 6,702,512 | B1 | 3/2004 | Reale | |
| 6,767,158 | B1 | 7/2004 | Consolazio et al. | |
| 6,843,614 | B2 | 1/2005 | Yodock, Jr. et al. | |
| 6,886,299 | B2 | 5/2005 | Gower | |
| 6,907,811 | B2 | 6/2005 | White | |
| 6,962,245 | B2 | 11/2005 | Ray et al. | |
| 7,021,005 | B1 * | 4/2006 | Curry | E05F 15/635 49/358 |
| 7,083,357 | B2 | 8/2006 | Lamore | |
| 7,101,112 | B2 | 9/2006 | Burns et al. | |
| 7,140,802 | B2 | 11/2006 | Lamore | |
| 7,172,176 | B1 | 2/2007 | Eastland | |
| 7,264,417 | B1 | 9/2007 | Nasatka | |
| 7,320,557 | B1 | 1/2008 | Potter | |
| 7,494,112 | B2 | 2/2009 | Fromm | |
| 7,819,604 | B2 | 10/2010 | Breed | |
| 7,862,251 | B2 * | 1/2011 | Lyddon | E01F 13/12 404/6 |
| 7,918,622 | B2 | 4/2011 | Whitford | |
| 7,959,373 | B1 | 6/2011 | Brown | |
| 8,215,866 | B2 * | 7/2012 | Whitford | F41H 5/14 404/9 |
| 10,370,808 | B2 * | 8/2019 | Neusch | E01F 13/12 |
| 10,407,852 | B2 | 9/2019 | Dickinson et al. | |
| 10,900,182 | B2 | 1/2021 | Harris et al. | |
| 10,941,531 | B2 | 3/2021 | Dickinson et al. | |
| 2002/0182007 | A1 | 12/2002 | Yodock, Jr. et al. | |
| 2003/0159356 | A1 | 8/2003 | Russell | |
| 2004/0089143 | A1 | 5/2004 | Gilon | |
| 2005/0220536 | A1 | 10/2005 | Blair et al. | |
| 2005/0254892 | A1 | 11/2005 | Yodock, III et al. | |
| 2006/0078380 | A1 | 4/2006 | Dehart | |
| 2006/0233607 | A1 | 10/2006 | Buckley et al. | |
| 2007/0272911 | A1 | 11/2007 | Fromm | |
| 2008/0157493 | A1 | 7/2008 | McConkey et al. | |
| 2008/0223857 | A1 | 9/2008 | Palley et al. | |
| 2009/0067923 | A1 | 3/2009 | Whitford | |
| 2009/0092443 | A1 | 4/2009 | Friedman et al. | |
| 2009/0250674 | A1 | 10/2009 | Darcy | |
| 2010/0202829 | A1 | 8/2010 | Gelfand et al. | |
| 2011/0271597 | A1 * | 11/2011 | Wilkinson | E01F 15/12 16/221 |
| 2012/0093581 | A1 | 4/2012 | Lamore | |
| 2012/0168702 | A1 | 7/2012 | Fromm | |
| 2015/0033628 | A1 * | 2/2015 | Barwick | E01F 13/06 49/70 |
| 2016/0053450 | A1 | 2/2016 | Neusch | |
| 2016/0160459 | A1 | 6/2016 | Orner, Jr. | |
| 2017/0204575 | A1 | 7/2017 | Klein | |
| 2017/0356203 | A1 | 12/2017 | Nagel | |
| 2019/0226167 | A1 | 7/2019 | Gerrard et al. | |
| 2019/0330812 | A1 | 10/2019 | Ptacek et al. | |
| 2020/0362524 | A1 | 11/2020 | Gerrard et al. | |
| 2022/0259889 | A1 | 8/2022 | Jordan | |
| 2023/0257946 | A1 | 8/2023 | Whitford | |

FOREIGN PATENT DOCUMENTS

| | | | |
|---|---|---|---|
| GB | 2178094 | A | 2/1987 |
| WO | 2006/088428 | A1 | 8/2006 |
| WO | 2007040626 | A2 | 4/2007 |
| WO | 2020170282 | A1 | 8/2020 |
| WO | 2023/229788 | A2 | 11/2023 |

OTHER PUBLICATIONS

International Search Report and Written Opinion dated Dec. 19, 2023 and prepared in PCT/US2023/020290.

Meridian Rapid Defense Group, Ventura CA Parade Protection. YouTube. Apr. 19, 2022. [Retrieved on Nov. 13, 2023]. Retrieved from internet: <URL: https://www.youtube.com/watch?v=0TFzLOVteBY>, entire video.

Fromm Barriers, Inc., Instant Protection When the Clock is Ticking, at least as early as Sep. 2006, 2 pages.

Meridian Rapid Defense Group, Better Barriers for the 21st Century—Archer 1000 Anti-Vehicie Barrier System, The Wayback Machine—https://web.archive.org/web/20090804105407/http://www.betterbarriers.com:80/products/archer1000/, at least as early as Aug. 4, 2009.

Meridian Rapid Defense Group, Better Barriers for the 21st Century—Transportation Products, The Wayback Machine—https://webarchive.org/web/20090804105417/http://www.betterbarriers.com:80/products/transportation/, at least as early as Aug. 4, 2009.

Meridian Rapid Defense Group, Better Barriers for the 21st Century—Archer 500, undated but at least as early as Mar. 27, 2014.

Meridian Rapid Defense Group, Better Barriers for the 21st Century—Archer 750, undated but at least as early as Jan. 8, 2016.

Meridian Rapid Defense Group, Better Barriers for the 21st Century—Rapid Gate, Archer Beam Gate, Archer Active Gate, The Wayback Machine—https://web.archive.org/web/20090803215738/http://www.betterbarriers.com:80/products/rapid_gate/, 2009 Meridian Rapid Defense Group, LLC, at least as early as Aug. 3, 2009.

Delta Scientific Corporation Portable Barriers:MP5000 posted on DeltaScientific.com original date unknown. Publication date unknown—first cited to the USPTO on Jul. 22, 2008 in U.S. Pat. No. 7,918,622.

General Dynamics Portable Vehicle Arresting Barrier General Dynamics advertisement original date unknown. Publication date unknown—first cited to the USPTO on Jul. 22, 2008 in U.S. Pat. No. 7,918,622.

The Mifram Group Modular Vehicle Barrier posted on MiframSecurity.com original date unknown. Publication date unknown—first cited to the USPTO on Jul. 22, 2008 in U.S. Pat. No. 7,918,622.

The Mojo Barriers Mojo Steel Barrier posted on MojoBarriers.com original date unknown. Publication date unknown—first cited to the USPTO on Jul. 22, 2008 in U.S. Pat. No. 7,918,622.

Delta Scientific Corporation product specification for model DSC2000 Phalanx Barrier posted on Delta Scientific Website dated Oct. 11, 2006.

Carnahan Conference Paper Albuquerque New Mexico Oct. 2004 Presented by Nigel Buckley. Publication date unknown—first cited to the USPTO on Jul. 22, 2008 in U.S. Pat. No. 7,918,622.

International Search Report and Written Opinion dated Jul. 21, 2023, prepared in International Application No. PCT/US2023/020291.

International Search Report and Written Opinion dated Sep. 26, 2023, prepared in International Application No. PCT/US2023/027296.

International Search Report and Written Opinion dated Nov. 17, 2023, prepared in International Application No. PCT/US2023/032320.

Meridian Rapid Defense Group, Archer Beam Gate Deployment and Use. YouTube. Sep. 5, 2019. [Retrieved on Oct. 23, 2019]. Retrieved from Internet:, URL: https://www.youtube.com/watch?v=a5EqkkAh-dY. entire video.

Australian Examination Report from Patent Application No. 2023338984 dated Feb. 11, 2026.

Australian Examination Report from Patent Application No. 2023338804 dated Mar. 18, 2026.

* cited by examiner

VEHICLE MITIGATION SYSTEM

CROSS-REFERENCE TO RELATED APPLICATIONS

This application claims the benefit of and priority to U.S. Provisional Application No. 63/404,842, filed on Sep. 8, 2022, which is hereby incorporated by reference in its entirety herein.

TECHNICAL FIELD

The present disclosure relates generally to the field of vehicle mitigation systems, and specifically to portable barriers and moveable gates capable of being rapidly deployed for protection against vehicular and military style breaches.

BACKGROUND

Vehicle intrusions into restricted, protected or secured areas are troublesome due to the damage that can be caused, both in terms of property damage and injury or loss of life. There are many scenarios in which it is desired to restrict vehicular traffic in an area. Examples include road construction and other construction sites in order to protect construction workers and equipment. Others include high-profile or highly attended events like parades, sporting events, and political gatherings, where it is desired to keep unauthorized vehicles away from certain areas, especially those that have large gatherings of pedestrians. Still others include secure facilities such as military bases, governmental facilities or areas designated as restricted by law enforcement. While it is possible in some instances to install permanent barriers, many events or situations require that protection against vehicular intrusion be quickly provided and then removed following an event or situation calling for such protection.

BRIEF DESCRIPTION OF THE DRAWINGS

Illustrative examples of the present disclosure are described in detail below with reference to the attached drawing figures, which are incorporated by reference herein, and wherein.

Figure 1:
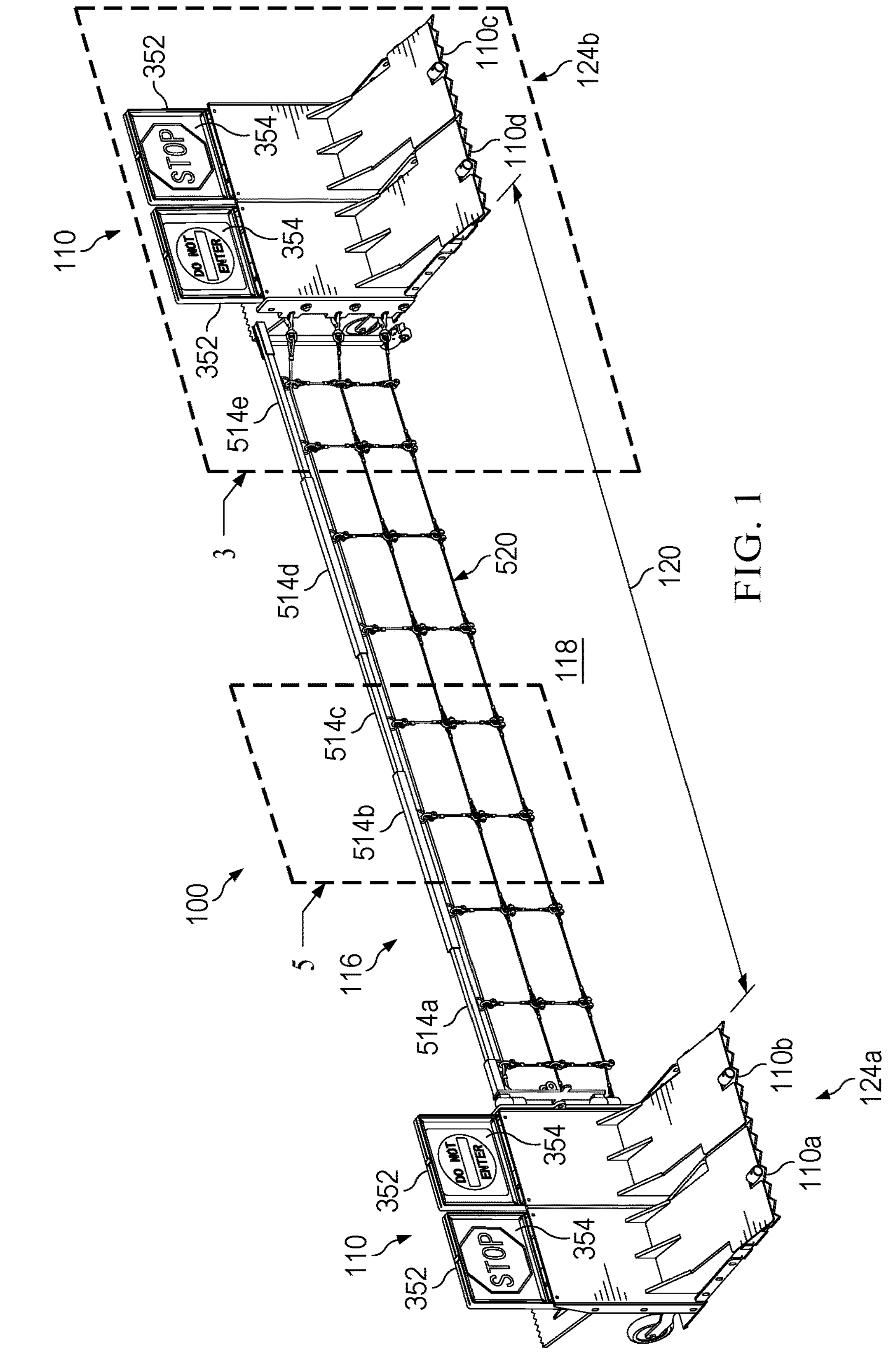
FIG. 1 illustrates a front perspective view of a vehicle mitigation system according to an embodiment.

The illustrated figures are only exemplary and are not intended to assert or imply any limitation with regard to the environment, architecture, design, or process in which different examples may be implemented.

DETAILED DESCRIPTION

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The present disclosure relates generally to the field of vehicle mitigation systems, and specifically to portable barriers and moveable gates capable of rapid deployment for protecting against vehicular and military style breaches. A vehicle mitigation system is described herein that includes a plurality of portable barriers that are positioned near an area that needs to be protected or secured. The portable barriers are arranged such that a spacing distance is provided between the barriers, and the barriers may be connected by a gate assembly that is capable of being moved between open and closed positions. Together, the barriers and the gate assembly are configured to absorb the kinetic energy of a vehicle as the vehicle contacts the vehicle mitigation system, and the barriers move with the vehicle following contact.

The portability of the vehicle mitigation system allows the system to be quickly deployed to areas requiring defense against vehicles and other traffic. The barriers are transported using a trailer and may be deployed by a single user with the assistance of a wheeled hauler. After positioning the barrier, the user may easily assemble and deploy the gate assembly to link the barriers together for additional protection.

FIGS. 1-8 illustrate several views of a vehicle mitigation system 100 according to an embodiment. The vehicle mitigation system may include four barriers, arranged in two pairs, and positioned with a gap or spacing distance between the two pair of barriers. A gate assembly is connected to at least one of the barriers and is capable of being opened to provide access between the pairs of barriers. When the gate assembly is closed and coupled to barriers on both sides of the gap, the system is configured to slow or stop an offending (errant or breaching) vehicle that attempts to pass through the gap. Together, the gate assembly and barriers are designed to surround the vehicle upon impact and drag the vehicle to a stop using the weight of the barriers, as well as teeth provided at the base of the barriers that dig into the road surface. While the embodiments illustrated herein may include a pair of barriers positioned on each side of the gap, a single portable barrier may be positioned on each side of the gap, or alternatively, more than two barriers may be positioned on either side of the gap. When multiple barriers are grouped together, the barriers may be rigidly connected to one another, to provide additional resistance against breaching vehicles.

Unlike most security gates and gate installations, the vehicle mitigation system is not a fixed installation but rather is portable and mobile. By using portable barriers as a support structure for the gate assembly, it is not necessary to permanently attach supports to a road or other surface in the area that is being protected. The gate assembly itself is also capable of being easily assembled and disassembled, thereby further enabling the portability and mobility of the vehicle mitigation system. The gate assembly, by using modular components, also is capable of being customized to fit the gap that is between the barriers, and the distance of that gap can be selectively determined by the security requirements of the site being protected and by the placement of the barriers.

The vehicle mitigation system is easy to install and requires no electricity, hydraulics or heavy machinery to move into place. The system can be easily assembled and deployed by one person. Removal of the system is also time efficient, and the system can be easily relocated to other areas where demand for vehicular or other traffic control is desired.

Figure 2:
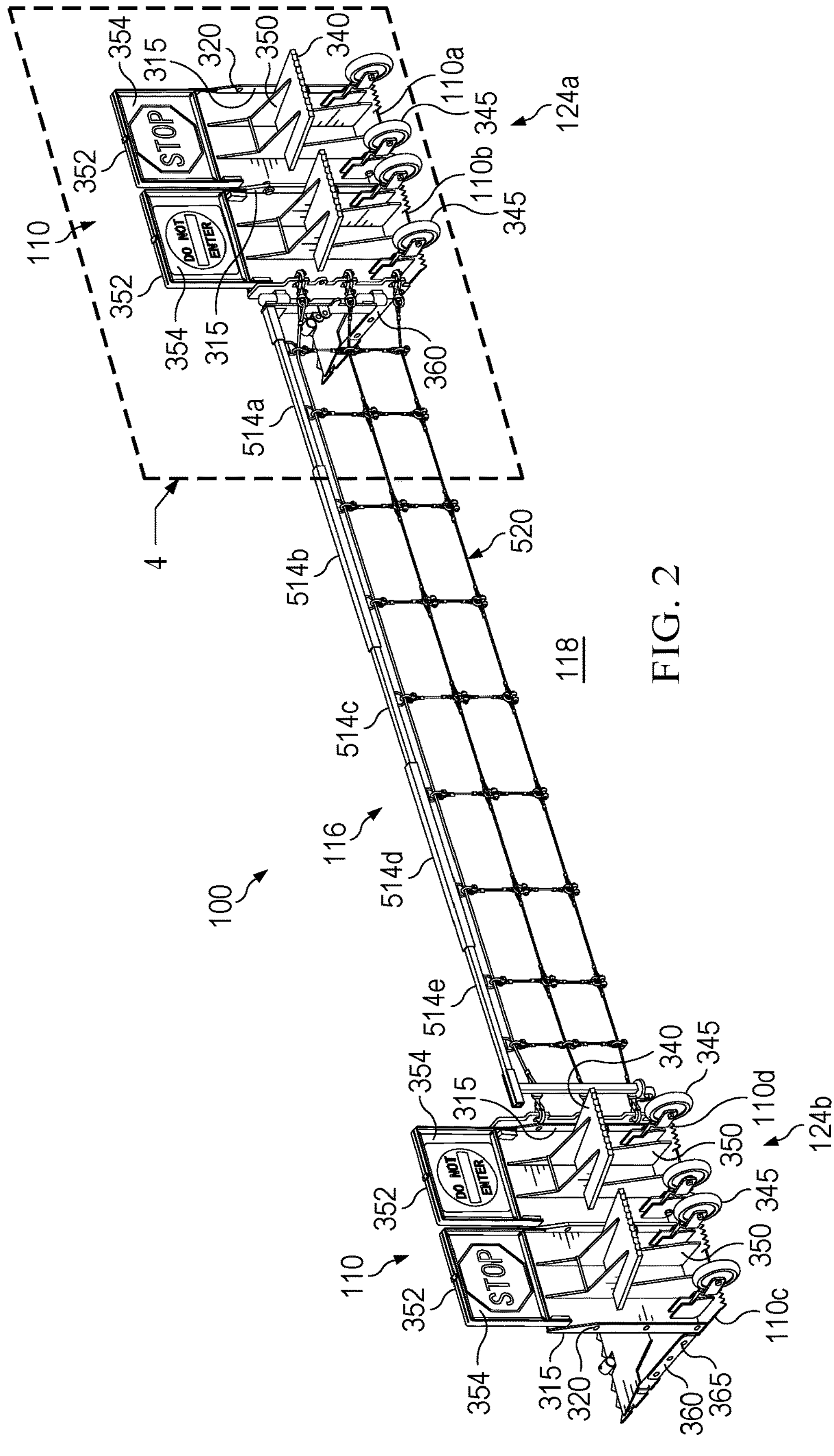
FIG. 2 illustrates a rear perspective view of the vehicle mitigation system of FIG. 1.

Referring more specifically to FIGS. 1 and 2, the vehicle mitigation system 100 according to an illustrative embodiment is illustrated. FIG. 1 depicts a front perspective view, while FIG. 2 depicts a rear perspective view of the vehicle mitigation system 100. Vehicle mitigation system 100 includes a plurality of portable barriers 110 and a gate assembly 116. Portable barriers 110 may be positioned on a surface 118 on both sides of a gap, or spacing distance 120. In some embodiment, the gap 120 may be a distance of 10, 12, or 14 feet depending on the security requirements of the site at which the vehicle mitigation system 100 is deployed. Operators deploying the barriers 110 position the barriers 110 to obtain the desired width or distance of the gap 120. While other gap distances, either shorter or longer, may be deployed in other embodiments, the gate assembly 116 would be sized appropriately as described herein to span the desired distance of the gap 120.

In the embodiment illustrated, a pair 124*a* of barriers is positioned on a first side of the gap 120 and a pair 124*b* of barriers is positioned on a second side of the gap 120. Pair 124*a* consists of an outer barrier 110*a* and an inner barrier 110*b*, which are rigidly connected to each other by bolts or other fasteners. The use of fasteners or other releasable means allows each of the barriers 110*a*, 110*b* to be individually moved to the deployment location and then coupled together. When it is desired to move or discontinue the use of the vehicle mitigation system 100, the barriers 110*a*, 110*b* may be disconnected from one another and then individually transported to a trailer or storage facility. Pair 124*b* includes an outer barrier 110*c* and an inner barrier 110*d*, which may be coupled together in the same manner as barriers 110*a*, 110*b*.

In other embodiments, it may be desirable to only deploy a single barrier on each side of the gap 120. In these embodiments, it may not be necessary to have the heavier grounding capability afforded by two barriers on each side. Such may be the case for providing gated security for pedestrians only or for smaller vehicles such as small passenger cars, utility vehicles (UTVs), all-terrain vehicles (ATVs), motorcycles, or bicycles. Alternatively, a single barrier could be used on each side, even with larger vehicles being the security focus, if the weight of the barrier were increased. One advantage, however, of using two or even more barriers on each side is that the task of deployment is simpler and can be managed by one or two people. Each barrier is individually placed and then coupled to the adjacent barrier on a particular side of the gap. This eases the moving of the barrier since the total weight of the barrier assembly on a particular side is divided up among the individual barriers that are deployed. When especially large vehicles are expected in the area, or if higher speeds are expected from the targeted vehicles, it may be desirable to have three or even more barriers connected on each side of the gap.

Figure 3:
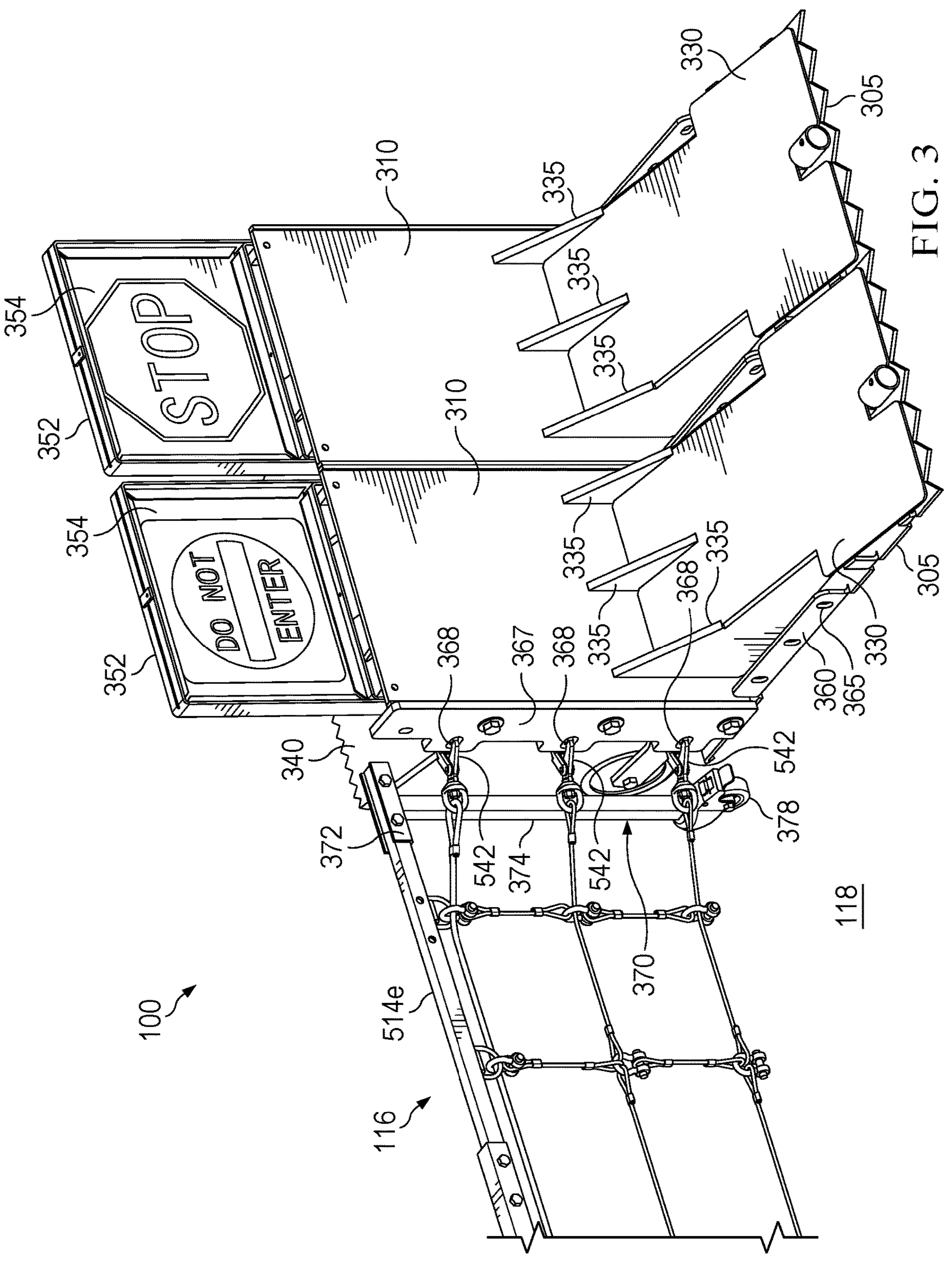
FIG. 3 represents an enlarged front perspective view of portable barriers of the vehicle mitigation system of FIG. 1.
Figure 4:
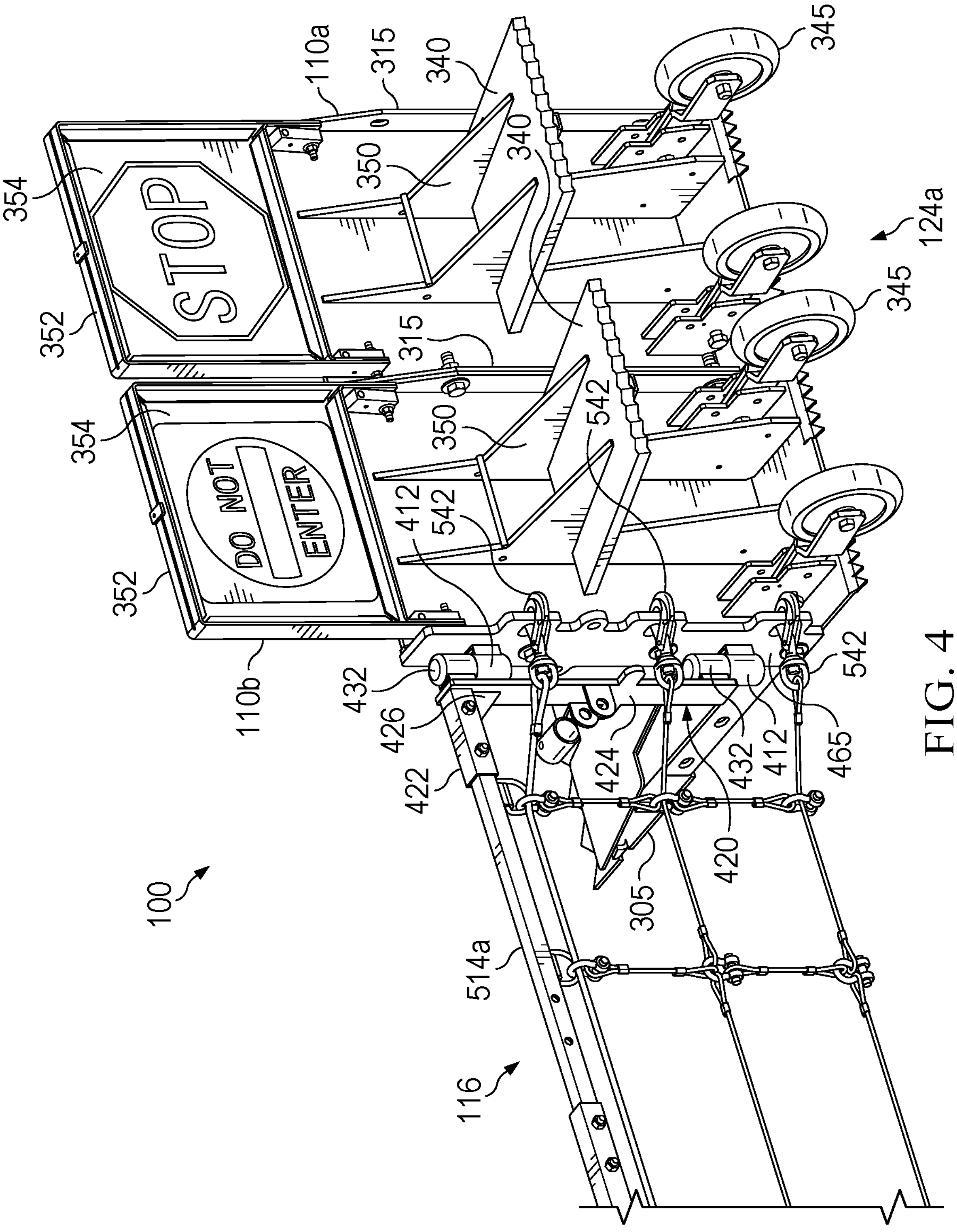
FIG. 4 represents an enlarged front perspective view of portable barriers of the vehicle mitigation system of FIG. 1.

FIGS. 3 and 4 illustrate perspective views of the portable barriers 110*a*, 110*b*, 110*c*, 110*d* on each side of the gap 120. While other portable barriers may effectively be deployed as part of the vehicle mitigation system 100, the illustrated portable barriers are particularly desirable due to the shape of the barriers and the barriers' ability, along with the gate assembly, to slow and stop vehicles. Portable barriers 110*a*, 110*b*, 110*c*, 110*d* are each generally L-shaped and include a base plate 305 for supporting the modular barrier on the surface 118 and an upwardly extending upright member 310 for receiving impact forces, and in some embodiments for providing munitions protection. A ramp 330 is provided on a first side of the upright member 310 and supported by a plurality of gussets 335, which are illustrated in FIGS. 3 and 4. Referring again to FIG. 2 which illustrates the opposite side of the barriers 110*a*, 110*b*, 110*c*, 110*d*, the barriers include vertically-oriented side plates 315 having apertures 320. The side plates 315 are integrally formed with, welded or otherwise attached to the upright member 310. The portable barriers may also include a kick plate 340 positioned on a second side of the upright member 310. A wheel assembly 345 is positioned beneath the kick plate 340, and the wheels of the wheel assembly are extendable into a transport position (shown in FIG. 2) to allow transport of the portable barrier. A plurality of gusset reinforcements 350 are provided on the second side of the upright member 310 to support the kick plate 340. A horizontally-oriented side plate 360 is provided along each edge of the base plate 305. The horizontally-oriented side plate 360 may be integrally formed with, welded or otherwise attached to the base plate. Similar to the vertically-oriented side plates 315, the horizontally-oriented side plates 360 include apertures 365. The vertically-oriented side plates 315 and the horizontally-oriented side plate 360 allow adjacent barriers to be rigidly, and preferably releasably, attached to one another. In the illustrated embodiment, bolts or other fasteners are passed through the apertures of the vertically-oriented side plates 315 and the horizontally-oriented side plate 360 to couple the barriers together.

The barriers 110*a*, 110*b*, 110*c*, 110*d* may each include a shield frame 352 capable of receiving and holding a shield 354 that may be used to convey information to motorists or pedestrians near the barriers. The shield may be comprised of weatherproof cardboard, paper, velum, vinyl or another material that is capable of displaying indicia to communicate information. Indicia may include cautionary messages such as "SLOW," "STOP," "CAUTION," or instead may contain information about the agency or department that is responsible for the deployment of the barriers such as "POLICE" or "DEPARTMENT OF TRANSPORTATION." In some embodiments, the shields may be used to convey advertising or other information.

Referring to FIG. 3, the barrier 110*d* includes a gate latch plate 367 rigidly attached to or integrally formed with the barrier 110*d*. In the illustrated embodiment, the gate latch plate 367 is attached by bolts or other fasteners to the vertically-oriented side plate 315 of the barrier 110*d* on a side of the barrier nearest the gate assembly 116. In addition to the apertures that may be provided to allow coupling to the barrier, the gate latch plate 367 may also include a plurality of apertures, openings or slots 368 that permit the gate assembly 116 to be releasably attached to the gate latch plate 367. In other embodiments, the barrier 110*d* may include gate latch plate 367 in lieu of the vertically-oriented side plate 315 such that the gate latch plate 367 is integrally formed with, welded to, or attached to another part of the barrier, such as the base plate or the upright member. Still another embodiment may omit the gate latch plate 367 from barrier 110*d* and instead provide apertures, openings, slots or attachment points similar to apertures 368 on another component of the barrier such as on the upright member. In any of these examples, the attachment of the gate assembly 116 to these plates or other components effectively is an attachment to the barrier 110*d* itself since forces applied to the gate assembly 116 will be transmitted to the barrier 110*d*.

Referring to FIG. 4, the barrier 110*b* includes a gate base 465 rigidly attached to or integrally formed with the barrier 110*b*. In the illustrated embodiment, the gate base 465 is attached by bolts or other fasteners to the vertically-oriented side plate 315 of the barrier 110*b* on a side of the barrier nearest the gate assembly 116. The gate base 465 may include apertures or other openings that allow the gate base 465 to be coupled to the barrier. The gate base 465 provides a base from which the gate assembly 116 may pivot as described in more detail below. The gate base 465 includes at least one, and in the illustrated embodiment, a pair of hinge bases 412 that are welded or otherwise rigidly attached to the gate base 465. Each hinge base 412 includes either a pin to mate with a complementary cavity or a cavity to mate with a complimentary pin on the corresponding hinge component associated with the gate assembly 116.

In other embodiments, the barrier may include the gate base 465 in lieu of the vertically-oriented side plate 315 such that the gate base 465 is integrally formed with, welded to, or attached to another part of the barrier, such as the base plate 305 or the upright member 310. Still another embodiment may omit the gate base 465 from barrier 110*b* and instead provide hinge components such as hinge bases 412 coupled directly to another component of barrier such as on the upright member 310. In any embodiment described above, the pivotal attachment of the gate assembly 116 to these plates or other components effectively is a pivotal attachment to the barrier 110*b* itself.

Figure 5:
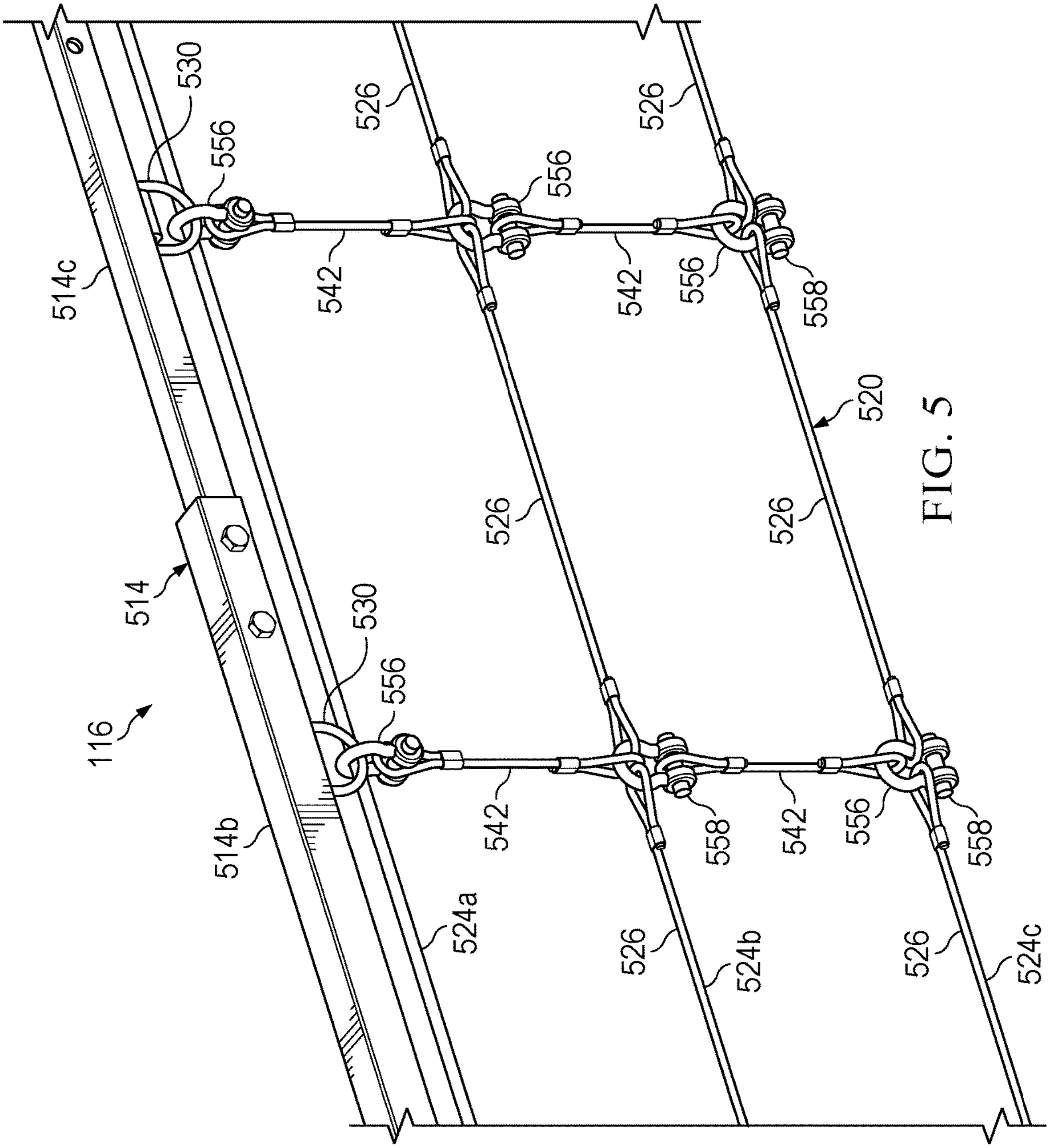
FIG. 5 represents an enlarged front perspective view of a gate assembly of the vehicle mitigation system of FIG. 1.
Figure 7:
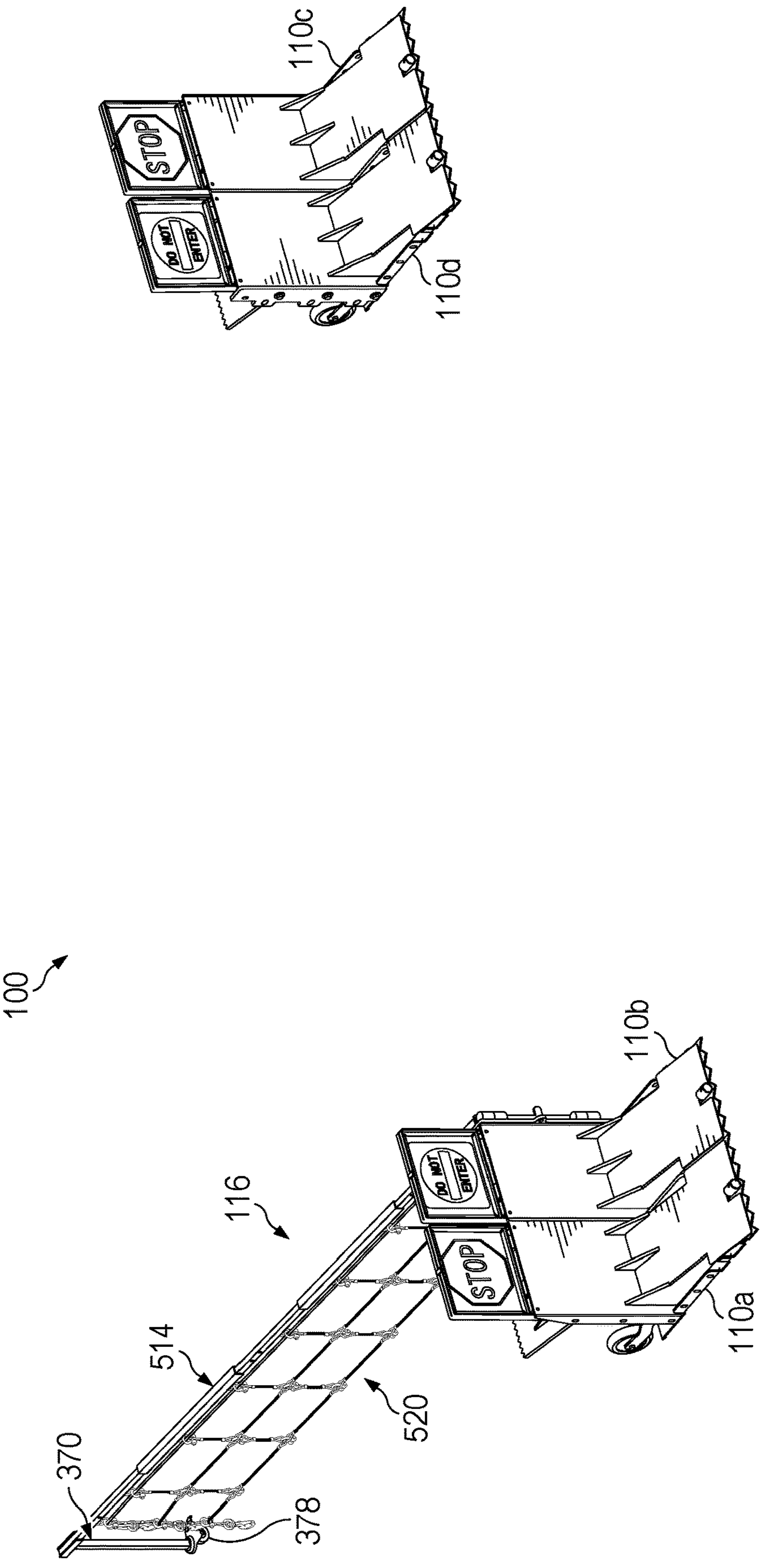
FIG. 7 represents the vehicle mitigation system of FIG. 1 in a first, fully open position.
Figure 8:
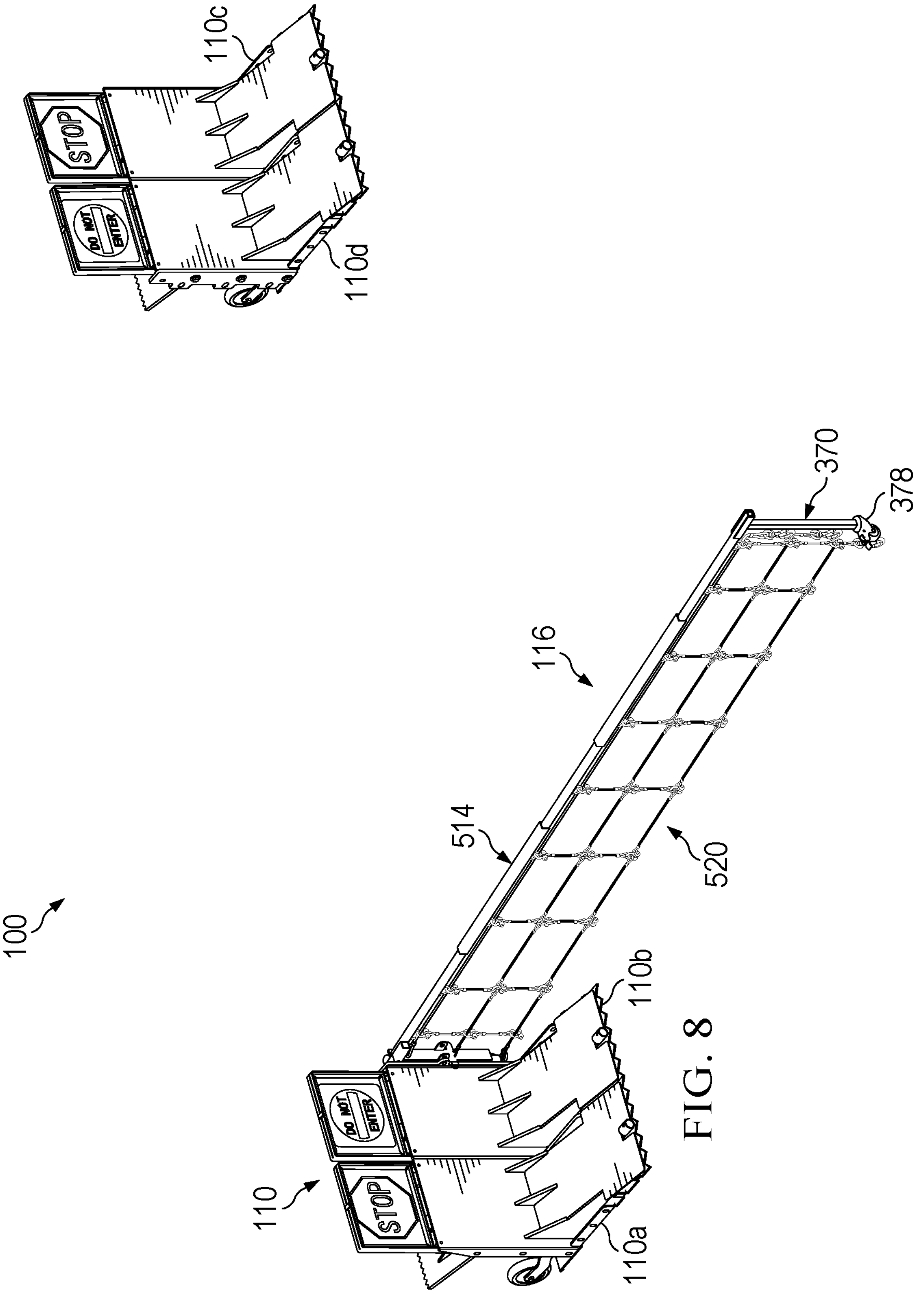
FIG. 8 represents the vehicle mitigation system of FIG. 1 in a second, fully open position.

Referring again to FIGS. 1 and 2, but also to FIG. 5, the gate assembly 116 includes a beam 514 pivotally attached to the portable barrier 110*b* such that the beam 514 (and the gate assembly 116 itself) is capable of being rotated between a closed position (FIGS. 1 and 2) and an open position (FIGS. 7 and 8). In an embodiment, the beam 514 is an elongated member that remains substantially parallel to the surface 118 during rotation and at rest in the open and closed positions. While the beam 514 could be comprised of a single length of square or round tubing or bar stock, in some embodiments, the beam 514 is comprised of a plurality of beam sections (514*a*, 514*b* . . . 514*e*) with each beam section coupled to an adjacent beam section. In the illustrated embodiment, the beam sections are coupled by bolts and other fasteners that are selectively removable when the beam 514 is to be disassembled. When the vehicle mitigation system 100 is not in use, disassembled beam sections may be stored in a storage box (not shown). The storage box may by mounted to one of the barriers 110 or may be stored or transported separately from the barriers 110.

The various beam sections may be sized differently to allow the beam sections to be more easily connectable. As illustrated in FIGS. 1, 2, and 5, beam sections 514*a*, 514*c*, 514*e* may be square tubing having a cross-sectional width of a first size, and beam sections 514*b*, 514*d* may be square tubing having a cross-section width of a second size that is larger than the first size. Preferably, in this embodiment the outer cross-sectional width of the smaller tubing is smaller than the inner cross-sectional width of the larger tubing such that the smaller tubing nests within and is received by the larger tubing. Apertures near the end of each beam section allow the nested tubes to be coupled and secured by bolts or other fasteners. By reducing the size of certain sections and allowing a portion of those beam sections to be received by the larger beam sections, the overall strength and stability of the beam assembly is increased.

The sectional nature of the beam also allows for modularity so that the beam can be easily adapted to different lengths to span gaps of greater or lesser distance, depending on the site requirements of the area being protected by the vehicle mitigation system 100. Although the lengths of each individual section could vary, in one embodiment, each beam section is 44 inches long, and a total of five sections are provided. This allows the beam to be selectively assembled to a length of 10, 12, or 14 feet depending on how many sections are used. In other embodiments, either additional sections could be provide with the vehicle mitigation system 100, or the length of individual sections could be changed to allow the beam to span gaps of greater or lesser distance than the preferred 10-14 feet. The sectional nature of the beam could also be achieved by alternative configurations such as a series of telescoping tubes that use either external fasters (such as the bolts illustrated in FIG. 5) or internal spring loaded buttons that are selectively depressed to allow extension of the telescoping tubes and then extend into an aperture when a desired and predetermined amount of extension is achieved. Again, in this embodiment, the overall length of the beam could be adjusted depending on how large a gap is needed between the barriers.

Although the beam 514 illustrated includes a square cross section, the cross-sectional profile of the beam could be round, rectangular or any other shape. In some embodiments, the beam could even be comprised of one or more sections of angled (i.e., L-shaped or U-shaped) material such as angle iron or angle aluminum. The type of material used for the beam could also vary. While metal such as steel or aluminum may be the more preferable choice, in some embodiments, the beam material may be a composite, carbon fiber, or polymer material.

Referring again to FIG. 3, the gate assembly 116 and beam 514 further include an end support member 370 having a beam attachment portion 372 and a ground support portion 374. The beam attachment portion 372 may be an additional section of tubing or a bracket made from an angular metal or other material. The beam attachment portion 372 is capable of being coupled to the adjacent beam section 514*e*. In the illustrated embodiment, the beam attachment portion 372 is coupled to the beam section 514*e* using bolts or other fasteners, which provides the ability to more easily disassemble, transport and store the various portions of vehicle mitigation system 100. The ground support portion 374 of the end support member 370 may be coupled to the beam attachment portion 372 preferably by welding or brazing, but instead may be coupled in any other manner such as by fasteners. The ground support portion 374 may be an elongated member such as another section of tubing that extends generally perpendicular to the beam section 514*e*. The presence of an end support member 370 on the beam 514 provides additional stability and support for the beam 514 at gate assembly 116. In the illustrated embodiment, a caster 378, which could be either a swivel caster or non-swiveling caster, is coupled to an end of the ground support portion 370 opposite that of the beam attachment portion 372. The caster is in contact with the surface 118 on which the barriers 110 are positioned and not only aid in the support of the beam 514, but also assist in the movement of the beam 514 between opened and closed positions by rolling the caster 378 across the surface 118. In the embodiment illustrated, the beam 514, including the end support member 370, is not coupled directly to the barrier 110*d*. However, in some embodiments additional latching mechanisms may be provided to allow the beam 514 to be releasably coupled to barrier 110*d*.

Referring again to FIG. 4, the gate assembly 116 and beam 514 further include a pivot support member 420 having a beam attachment portion 422 and a rotational base portion 424. The beam attachment portion 422 may be an additional section of tubing or a bracket made from an angular metal or other material. The beam attachment portion 422 is capable of being coupled to the adjacent beam section 514*a*. In the illustrated embodiment, the beam attachment portion 422 is coupled to the beam section 514*a* using bolts or other fasteners, which provides the ability to more easily disassemble, transport and store the various portions of vehicle mitigation system 100. The rotational base portion 424 of the pivot support member 420 may be coupled to the beam attachment portion 422 preferably by welding or brazing, but instead may be coupled in any other manner such as by fasteners. A gusset 426 or other support may be welded or otherwise coupled between the beam attachment portion 422 and rotational base portion 424 to provide further strength to the pivot support member 420. The ground support portion 424 may be an elongated member that extends generally perpendicular to the beam section 514*a*. In the illustrated embodiment, the rotational base portion 424 is comprised of a steel plate for strength, but other materials could be used in lieu of steel. Similarly, it is not necessary that a plate be used, but instead the rotational base portion 424 could be another section of tubing or bar stock similar to that of the beam 514. The rotational base portion 424, as a part of the beam 514 and gate assembly 116, is pivotally coupled to the gate base 465 of the barrier 110*b*. A pair of hinge bases 432 (or however many bases are required to compliment the hinge bases 412 of the gate base 465) are welded or otherwise rigidly attached to the rotational base portion 424. As previously mentioned, the hinge bases 432 are meant to rotationally engage the hinge bases 412 of the gate base 465 such that rotation of the beam 514 relative to the barrier 110*b* is permitted. Either of the hinge bases 412, 432 may have an integral pin that is received by the other hinge base, or alternatively a separate pin may be inserted through passages in each hinge base 412, 432 to provide rotational functionality. The pin (not shown) acts as an axis about which the beam 514 is capable of rotating.

FIG. 5 illustrates an enlarged front perspective view of a portion of the gate assembly 116. The gate assembly 116 includes an arrestor net 520 formed by a plurality of interconnected arrestor cables. The net 520 is preferably coupled to the beam 514 such that the beam 514 carries the net as the beam is moved between the open and closed positions. By supporting the net 520, the beam 514 also keeps the arrestor net 520 hanging in an organized and untangled manner that facilitates quick connection of the net to the barriers 110*b*, 110*d* on both sides of the gap. The arrestor net 520 includes a plurality of main arrestor cables 524*a*, 524*b*, 524*c* that are generally arranged substantially parallel to the beam 514. In the illustrated embodiment, three main arrestor cables 524*a*, 524*b*, 524*c* are provided. The uppermost main arrestor cable 524*a* is positioned just below the beam 514 itself and is supported by a plurality of rings 530 coupled to the beam. The rings 530 may be D-rings, circular rings, eyelets, shackles or any other type of hardware capable of coupling the main arrestor cable 524*a* to the beam 514. In other embodiments, fewer main arrestor cables may be provided, or to provide additional resistance to vehicle incursions, more than three main arrestor cables may be provided. In one embodiment, a main arrestor cable may be routed through a hollow passage of the beam 514 itself.

The main arrestors cables 524*a*, 524*b*, 524*c* are each attached on both ends to one of the barriers 110*b*, 110*d*. The main arrestor cables preferably include a releasable member 542 (see FIGS. 3 and 4) at each end of the main arrestor cable that allows for the cables to be releasably and selectively coupled to the barriers 110*b*, 110*d*. In the illustrated embodiment, the releasable member 542 is a high-strength hook with a clasp that allows the hook to be passed through the desired aperture on the barrier 110*b*, 110*d* and then secured by the clasp. The clasp may or may not be spring biased to close, and the releasable member 542 may further include a swivel to allow the releasable member 542 to rotate without twisting the cable to which it is attached. As mentioned previously, the barriers 110*b*, 110*d* include apertures or opening that may be provided in the gate latch plate 367 and the gate base 465 that receive the releasable members 542 of the main arrestor cables 524*a*, 524*b*, 524*c* when attached. Preferably, the main arrestor cables 524*a*, 524*b*, 524*c* will remain attached to the gate base 465 even when the gate assembly 116 is opened. The main arrestor cables 524*a*, 524*b*, 524*c* will be disconnected from the gate latch plate 367 before moving the gate assembly 116 out of the closed position.

Each of the main arrestor cables 524*a*, 524*b*, 524*c* may be a single continuous cable spanning the gap between the barriers 110*b*, 110*d*, or alternatively, one or more of the arrestor cables may be comprised of a plurality of cable sections. In the embodiment illustrated in FIG. 5, the uppermost main arrestor cable 524*a* is a single continuous cables with crimp-retained loops on each end that allow attachment of the cable to the releasable member 542. The other two main arrestor cables 524*b*, 524*c* each are comprised of multiple cable sections 526, which in one embodiment may be 2 ft sections of cable. Each cable section 526 includes a crimp-retained looped formed on both ends. This facilitates coupling of a cable section to adjacent cable sections 526. The use of the term “main arrestor cable” herein is meant to encompass both configurations—a continuous cable that spans the entire gap between the barriers and a cable that has a plurality of discrete sections that are coupled together to span the gap. In either configuration, the arrestor net 520 may be adjusted to match the desired gap between the barriers 110, either by using more sections 526 of cable or by providing multiple lengths of continuous cables such as main arrestor cable 524*a*.

Connected between the main arrestor cables 524*a*, 524*b*, 524*c* are a plurality of lateral arrestor cables 542. The lateral arrestor cables 542 are generally assembled in an orientation that is substantially perpendicular to the beam 116 and the main arrestor cables 524*a*, 524*b*, 524*c*. Like the main arrestor cables 524*a*, 524*b*, 524*c*, the lateral arrestor cables 542 may be a single continuous cable that extends from the beam 116 (or alternatively the uppermost main arrestor cable 524*a*) to the lowermost main arrestor cable 524*c*, or instead, the lateral arrestor cables 542 may include a plurality of cable sections. In the illustrated embodiment, discrete cable sections are used between each of the main arrestor cables 524*a*, 524*b*, 524*c*. Each section of the lateral arrestor cables

542 may include a crimp-retained loop on each end of the section to allow attachment to each main arrestor cable and to the vertically-adjacent, lateral arrestor cable sections. In FIG. 5, U-bolts or shackles 556 are provided to connect adjacent sections of lateral arrestor cables 542 and to connect the lateral arrestor cables 542 to the main arrestor cables 524*a*, 524*b*, 524*c*. The shackles 556 are high-strength hardware that is capable of handling the forces encountered during a vehicle incursion. In some embodiments, the shackles 556 may include a closed-eyelet clamp or screw pin 558 that allows for simple assembly and securement of the various cable sections. In other embodiments, hooks, carabineers or other hardware may be used as an alternative to the illustrated shackles.

Figure 6:
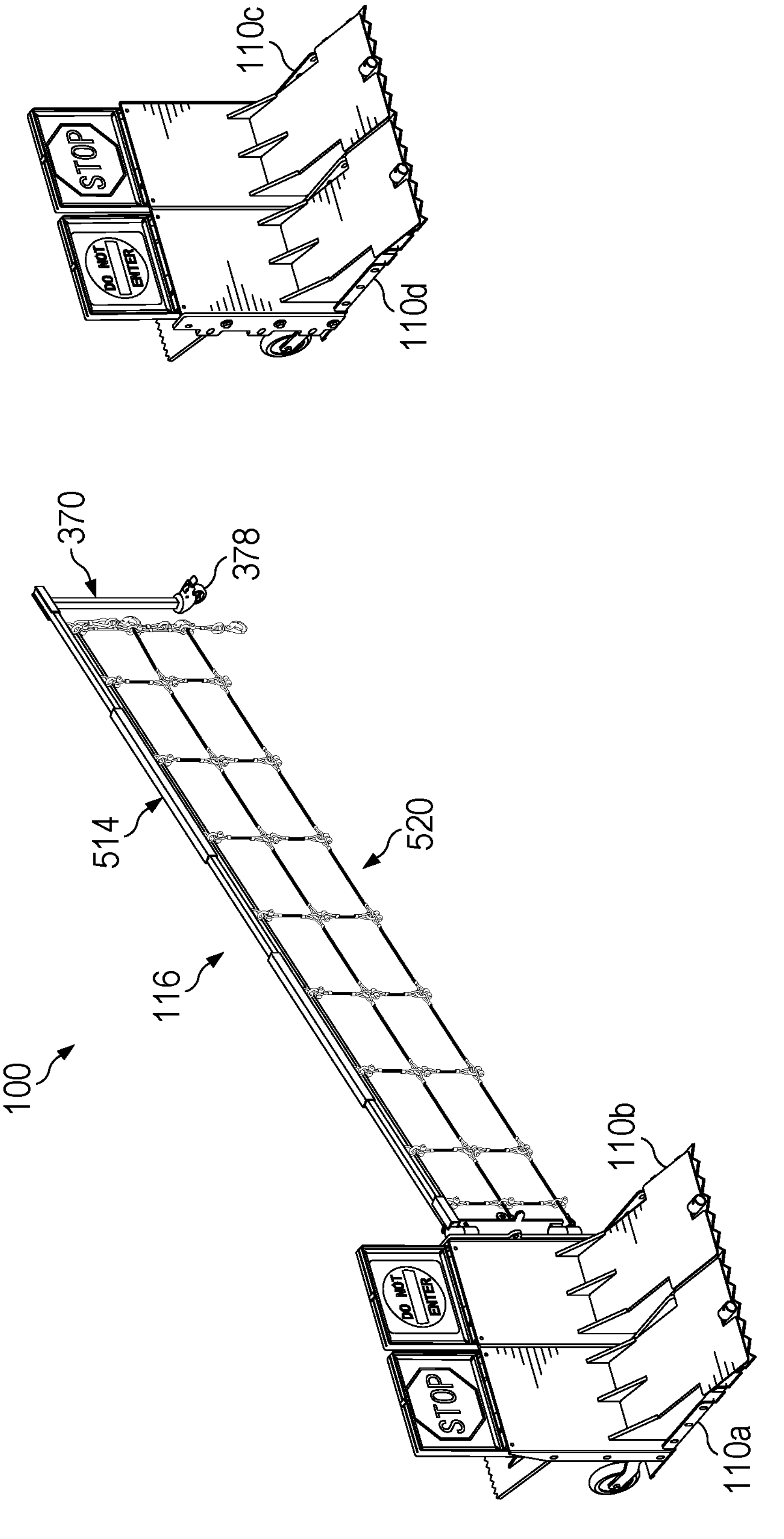
FIG. 6 represents the vehicle mitigation system of FIG. 1 in a partially open position.

FIGS. 6-8 depict configurations of the vehicle mitigation systems with the gate assembly 116 positioned in various positions. In FIG. 6, the gate assembly 116 has been uncoupled from the barrier 110*d*, and the gate assembly has been moved partially from the closed position (FIG. 1) toward the open position. In. FIG. 7, the gate assembly 116 has been moved to the open position. FIG. 8 illustrates the gate assembly 116 also in the open position, but with the gate assembly rotated in a direction opposite that of FIG. 7.

Together, the barriers 110 and gate assembly 116 serve as a mobile system that is capable of absorbing the kinetic energy of a vehicle to slow or stop the vehicle. The gate assembly 116 may be opened to allow authorized vehicle traffic or pedestrians to pass between the barriers 110, or the gate assembly 116 may be closed to allow the arrestor net 520 (or arrestor cables) to be connected to the barriers 110, thereby securely spanning the gap between the barriers 110. While one purpose of the beam is to carry the arrestor net/cables between the closed and opened positions of the gate assembly 116, the beam could also serve to absorb the kinetic energy of a vehicle, especially if the beam were connected to the barriers on both sides of the gap.

When the gate assembly 116 is closed and is engaged by a vehicle, the arrestor net 520 is the first impediment that the vehicle likely encounters. The high-strength properties of the arrestor cables and hardware reduce the likelihood that any of the cables break when contacted by the vehicle. As the vehicle moves forward into the arrestor net 520, the forward force of the vehicle is transferred through the arrestor net 520 to the barriers 110 on either side of the arrestor net 520. The weight of the barriers 110 resists the forward force (and motion) of the vehicle, and as the vehicle moves forward into the arrestor net 520, the barriers 110 are in many instances dragged inward toward the vehicle, and the arrestor net 520 and barriers 110 cradle the vehicle. This cradling of the vehicle, coupled with the weight of the barriers ultimately either significantly slow or stop the vehicle.

In some instances, when a vehicle approaches the vehicle mitigation system 100 in a manner that does not engage the arrestor net 520 (i.e., when the vehicle first strikes one of the barriers to either side of the gap), the barriers are configured to slow or stop the vehicle in a manner similar to that where an individual portable barrier is used to provide security. An example of the barriers used with the presently described vehicle mitigation system 100 is the Archer 1200' barrier sold by Meridian Rapid Defense Group LLC.

Crash testing was performed according to ASTM F2656-20 on the vehicle mitigation system 100 illustrated in FIG. 1. The testing verified the ability of the vehicle mitigation system 100 to stop a vehicle weighing 2500 lb traveling at 30 mph in 18 ft. This testing earned the vehicle mitigation system 100 an ASTM P2 rating.

In one exemplary application, the vehicle mitigation systems described herein may be deployed in a construction zone. In another exemplary application, the vehicle mitigation systems may be deployed in an overhead power line construction site. In another exemplary application, the vehicle mitigation systems may be deployed at a manhole construction site. The vehicle mitigation systems may be used in typical traffic management applications for several scenarios including events, bridge construction, diversions, detours, road closures, lane closures, protective security, mass gatherings, building sites, mines, parks and sportsgrounds and road maintenance. In addition to preventing the unwanted intrusion of unauthorized vehicles and traffic, through the use of the movable gate assembly, the vehicle mitigation systems allows selective access for emergency and authorized vehicles.

In addition to the embodiments and examples of a vehicle mitigation system provided above, the following are illustrative examples of a vehicle mitigation system.

Example 1. A vehicle mitigation system comprises a first portable barrier, a second portable barrier, and a gate assembly comprising a beam pivotally attached to the first portable barrier. The beam is capable of rotating between a closed position and an open position such that the beam remains substantially parallel to a surface on which the first and second portable barriers are positioned. The gate assembly includes at least one arrestor cable attached between the first portable barrier and the second portable barrier such that the arrestor cable spans a distance between the first and second portable barriers.

Example 2. The example of claim 1, wherein the gate assembly further comprises a net formed by a plurality of interconnected arrestor cables.

Example 3. The system of example 1, wherein the gate assembly further comprises a net formed by a plurality of interconnected arrestor cables, and the net is coupled to the beam such that the beam carries the net as the beam is moved between the open and closed positions.

Example 4. The system of examples 2 or 3, wherein the plurality of interconnected arrestor cables further comprises a first main arrestor cable extending between the first barrier and the second barrier, a second main arrestor cable extending between the first barrier and the second barrier, and a plurality of lateral arrestor cables. Each lateral arrestor cable is coupled to the first main arrestor cable and the second main arrestor cable.

Example 5. The system of example 4, wherein the beam is connected to either or both of the first main arrestor cable and one of the lateral arrestor cables.

Example 6. The system of example 4, wherein the first main arrestor cable and the second main arrestor cable are substantially parallel to the beam.

Example 7. The system of example 4, wherein the first main arrestor cable and the second main arrestor cable are each releasably coupled to the second barrier.

Example 8. The system of any of examples 4-7, wherein the first main arrestor cable and the second main arrestor cable each comprise a releasable hook to permit releasable coupling to the second barrier.

Example 9. The system of any of examples 1-8, wherein the beam further comprises a plurality of beam sections, each beam section coupled to an adjacent beam section.

Example 10. The system of any of examples 1-9, wherein the beam further comprises at least one first beam section of a first size and at least one second beam section of a second size; the second size is smaller than the first size, allowing the second beam section to be received by an adjacent first beam section; and the first beam section is coupled to the adjacent second beam section.

Example 11. The system of any of examples 1-10, wherein the gate assembly further comprises an end support member coupled to the beam near an end of the beam nearest the second barrier.

Example 12. The system of example 11, wherein the gate assembly further comprises a caster coupled to the end support member and configured to roll on the surface as the beam rotates between the closed and open positions.

Example 13. The system of any of examples 1-12 further comprising a shield coupled to one of the first and second barriers. The shield includes indicia to communicate information to operators of vehicles or pedestrians in proximity to the vehicle mitigation system.

Example 14. The system of any of examples 1-13 wherein the first portable barrier further comprises a first inner barrier having a base plate and an upright member coupled to the base plate, and a first outer barrier having a base plate and an upright member coupled to the base plate. The first inner barrier is rigidly coupled to the first outer barrier. The second portable barrier further comprises a second inner barrier having a base plate and an upright member coupled to the base plate, and a second outer barrier having a base plate and an upright member coupled to the base plate. The second inner barrier is rigidly coupled to the second outer barrier.

Example 15. A vehicle mitigation system comprises a first portable barrier, a second portable barrier, and a gate assembly. The gate assembly comprises a beam pivotally attached to the first portable barrier. The beam is capable of rotating between a closed position and an open position such that the beam remains substantially parallel to a surface on which the first and second portable barriers are positioned. The gate assembly further comprises an arrestor net coupled to the beam such that the beam carries the net as the beam is moved between the open and closed positions. The arrestor net includes a first main arrestor cable extending between the first barrier and the second barrier, a second main arrestor cable extending between the first barrier and the second barrier, and a plurality of lateral arrestor cables, each lateral arrestor cable coupled to the first main arrestor cable and the second main arrestor cable. The gate assembly further comprises an end support member coupled to the beam near an end of the beam nearest the second portable barrier.

Example 16. A method of slowing a vehicle comprises deploying a first portable barrier and a second portable barrier, the first and second portable barriers separated by a spacing distance; moving a gate assembly from an open position to a closed position, the gate assembly having a beam pivotally attached to the first portable barrier such that the beam remains substantially parallel to a surface on which the first and second portable barriers are positioned when rotated, the gate assembly having an arrestor net coupled to the beam such that the beam carries the net as the beam is moved between the open and closed positions; and attaching a portion of the arrestor net to the second portable barrier.

Example 17. The method of example 16, wherein the arrestor net is also attached to the first portable barrier.

Example 18. The method of example 16 or 17 further comprising disconnecting the portion of the arrestor net from the second portable barrier, and moving the gate assembly from the closed position to the open position.

Example 19. The method of any of examples 16-18, wherein attaching a portion of the arrestor net to the second portable barrier further comprises attaching a first main arrestor cable of the arrestor net to the second portable barrier, and attaching a second main arrestor cable of the arrestor net to the second portable barrier. Both the first main arrestor cable and the second main arrestor cable are also attached to the first portable barrier to span the spacing distance.

Example 20. The method of any of examples 16-19 further comprising supporting an end of the beam opposite the pivotal attachment to the first portable barrier with a caster in contact with the surface, and while opening or closing the gate assembly, rolling the caster across the surface.

Although the present disclosure and its advantages have been described in detail, it should be understood that various changes, substitutions and alterations can be made herein without departing from the spirit and scope of the disclosure as defined by the following claims.

What is claimed is:

1. A vehicle mitigation system, comprising:

a first portable barrier;

a second portable barrier; and a gate assembly comprising a beam pivotally attached to the first portable barrier, the beam capable of rotating between a closed position and an open position such that the beam remains substantially parallel to a surface on which the first and second portable barriers are positioned, the gate assembly comprises a net formed by a plurality of interconnected arrestor cables attached between the first portable barrier and the second portable barrier such that the net spans a distance between the first and second portable barriers, wherein the plurality of interconnected arrestor cables comprises:

a first main arrestor cable extending between the first portable barrier and the second portable barrier and disposed below the beam;

a second main arrestor cable extending between the first portable barrier and the second portable barrier and disposed below and substantial parallel to the first main arrestor cable;

a third main arrestor cable extending between the first portable barrier and the second portable barrier and disposed below and substantial parallel to the second main arrestor cable;

the first main arrestor cable is releasably coupled to the second portable barrier via a first hook coupled to an end of the first main arrestor cable;

the second main arrestor cable is releasably coupled to the second portable barrier via a second hook; and the third main arrestor cable is releasably coupled to the second portable barrier via a third hook.

2. The system of claim 1, wherein the gate assembly further comprises a caster configured to roll on the surface as the beam rotates between the closed and open positions.

3. The system of claim 1, wherein the net is coupled to the beam such that the beam carries the net as the beam is moved between the open and closed positions.

4. The system of claim 1, wherein the plurality of interconnected arrestor cables further comprises a first plurality of lateral arrestor cables, each lateral arrestor cable of the first plurality is coupled to at least the first main arrestor cable and the second main arrestor cable.

5. The system of claim 4, wherein the beam is connected to either or both of the first main arrestor cable and one of the lateral arrestor cables.

6. The system of claim 4, wherein the first main arrestor cable and the second main arrestor cable are substantially parallel to the beam.

7. The system of claim 4, wherein the plurality of interconnected arrestor cables further comprises a second plurality of lateral arrestor cables, each lateral arrestor cable of the second plurality is coupled to at least the second main arrestor cable and the third main arrestor cable.

8. The system of claim 1, wherein the plurality of interconnected arrestor cables further comprises a plurality of lateral arrestor cables, and wherein the lateral arrestor cables are coupled to the first main arrestor cable, the second main arrestor cable, and/or the third main arrestor cable.

9. The system of claim 1, wherein the beam further comprises a plurality of beam sections, each beam section coupled to an adjacent beam section.

10. The system of claim 1, wherein:

the beam further comprises at least one first beam section of a first size and at least one second beam section of a second size;

the second size is smaller than the first size, allowing the second beam section to be received by an adjacent first beam section; and the first beam section is coupled to the adjacent second beam section.

11. The system of claim 1, wherein the gate assembly further comprises an end support member coupled to the beam near an end of the beam nearest the second portable barrier.

12. The system of claim 11, wherein the gate assembly further comprises a caster coupled to the end support member and configured to roll on the surface as the beam rotates between the closed and open positions.

13. The system of claim 1, further comprising:

a shield coupled to one of the first portable barrier or the second portable barrier;

wherein the shield includes indicia to communicate information to operators of vehicles or pedestrians in proximity to the vehicle mitigation system.

14. The system of claim 1, wherein:

the first portable barrier further comprises:

a first inner barrier having a base plate and an upright member coupled to the base plate;

a first outer barrier having a base plate and an upright member coupled to the base plate;

wherein the first inner barrier is rigidly coupled to the first outer barrier;

the second portable barrier further comprises:

a second inner barrier having a base plate and an upright member coupled to the base plate; and a second outer barrier having a base plate and an upright member coupled to the base plate;

wherein the second inner barrier is rigidly coupled to the second outer barrier.

15. A vehicle mitigation system, comprising:

a first portable barrier;

a second portable barrier; and a gate assembly comprising:

a beam pivotally attached to the first portable barrier, the beam capable of rotating between a closed position and an open position such that the beam remains substantially parallel to a surface on which the first and second portable barriers are positioned;

an arrestor net coupled to the beam such that the beam carries the arrestor net as the beam is moved between the open and closed positions, the arrestor net comprises:

a first main arrestor cable extending between the first portable barrier and the second portable barrier;

a second main arrestor cable extending between the first portable barrier and the second portable barrier;

a third main arrestor cable extending between the first portable barrier and the second portable barrier;

the first main arrestor cable is releasably coupled to the second portable barrier via a first hook coupled to an end of the first main arrestor cable;

the second main arrestor cable is releasably coupled to the second portable barrier via a second hook;

the third main arrestor cable is releasably coupled to the second portable barrier via a third hook;

a first plurality of lateral arrestor cables, each lateral arrestor cable of the first plurality is coupled to the first main arrestor cable and the second main arrestor cable; and a second plurality of lateral arrestor cables, each lateral arrestor cable of the second plurality is coupled to the second main arrestor cable and the third main arrestor cable; and an end support member coupled to the beam near an end of the beam nearest the second portable barrier.

16. The vehicle mitigation system of claim 15, wherein:

the first portable barrier further comprises:

a first inner barrier having a base plate and an upright member coupled to the base plate;

a first outer barrier having a base plate and an upright member coupled to the base plate;

wherein the first inner barrier is rigidly coupled to the first outer barrier;

the second portable barrier further comprises:

a second inner barrier having a base plate and an upright member coupled to the base plate; and a second outer barrier having a base plate and an upright member coupled to the base plate;

wherein the second inner barrier is rigidly coupled to the second outer barrier.

17. A method of slowing a vehicle, comprising:

deploying a first portable barrier and a second portable barrier, the first and second portable barriers separated by a spacing distance;

moving a gate assembly from an open position to a closed position, the gate assembly comprising a beam pivotally attached to the first portable barrier such that the beam remains substantially parallel to a surface on which the first and second portable barriers are positioned when rotated, the gate assembly further comprising an arrestor net coupled to the beam such that the beam carries the arrestor net as the beam is moved between the open and closed positions, wherein: the arrestor net comprises:

a first main arrestor cable extending between the first portable barrier and the second portable barrier;

a second main arrestor cable extending between the first portable barrier and the second portable barrier;

a third main arrestor cable extending between the first portable barrier and the second portable barrier;

the first main arrestor cable is releasably coupled to the second portable barrier via a first hook coupled to an end of the first main arrestor cable;

the second main arrestor cable is releasably coupled to the second portable barrier via a second hook; and the third main arrestor cable is releasably coupled to the second portable barrier via a third hook; and attaching a portion of the arrestor net to the second portable barrier.

18. The method of claim 17, wherein the arrestor net is also attached to the first portable barrier.

19. The method of claim 17, further comprising:

disconnecting the portion of the arrestor net from the second portable barrier; and moving the gate assembly from the closed position to the open position.

20. The method of claim 17, wherein attaching a portion of the arrestor net to the second portable barrier further comprises:

attaching the first main arrestor cable of the arrestor net to the second portable barrier; and attaching the second main arrestor cable of the arrestor net to the second portable barrier;

wherein both the first main arrestor cable and the second main arrestor cable are also attached to the first portable barrier to span the spacing distance.

21. The method of claim 17, further comprising:

supporting an end of the beam opposite the pivotal attachment to the first portable barrier with a caster in contact with the surface; and while opening or closing the gate assembly, rolling the caster across the surface.

22. The method of claim 17, wherein:

the first portable barrier further comprises:

a first inner barrier having a base plate and an upright member coupled to the base plate;

a first outer barrier having a base plate and an upright member coupled to the base plate;

wherein the first inner barrier is rigidly coupled to the first outer barrier;

the second portable barrier further comprises:

a second inner barrier having a base plate and an upright member coupled to the base plate; and a second outer barrier having a base plate and an upright member coupled to the base plate;

wherein the second inner barrier is rigidly coupled to the second outer barrier.

* * * * *